L. F. ROEDER.
VISE STAND.
APPLICATION FILED MAY 3, 1918.
1,381,663.
Patented June 14, 1921.
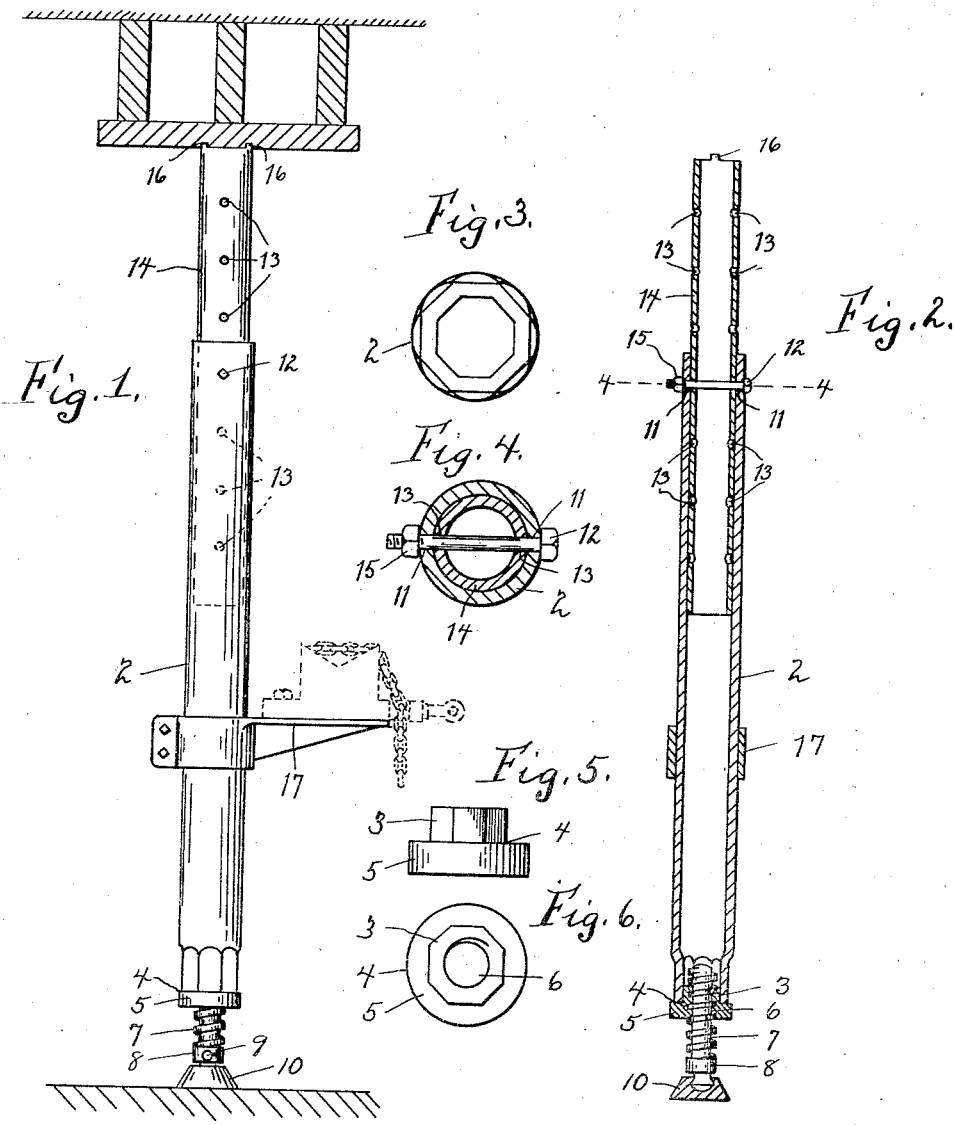
INVENTOR.
Lawrence F. Roeder
BY
Williamson
ATTORNEY.

UNITED STATES PATENT OFFICE.

LAWRENCE F. ROEDER, OF PHILADELPHIA, PENNSYLVANIA.

VISE-STAND.

1,381,663.  Specification of Letters Patent.  Patented June 14, 1921.

Application filed May 3, 1918. Serial No. 232,191.

*To all whom it may concern:*

Be it known that I, LAWRENCE F. ROEDER, a citizen of the United States, residing at Philadelphia, in the county of Philadelphia and State of Pennsylvania, have invented new and useful Improvements in Vise-Stands, of which the following is a specification.

My invention relates to new and useful improvements in vise stands, and has for its object to provide an exceedingly simple and effective device of this character which may be readily and quickly placed in position and held in place by the floor and ceiling of a room or building and which may be readily and quickly adjusted to the varying distances between the floor and ceiling of different rooms or buildings.

A further object of the invention is to provide a vise stand which may be transported from place to place and which under certain conditions may be relatively small and light so that the same can be carried by a workman and which after being transported to the place desired may be readily adjusted and set up for use.

Another object of the invention is to provide a vise stand which may be adjusted at one end to approximately fit the space where it is to be used and then adjusted at the other end so that the parts will be moved to fill up the space where the stand is to be used thereby firmly positioning it so that it may be used as a stand for a vise bracket or table or other similar object.

A further object of the invention is to provide a vise stand consisting of two tubes or pipes of different size, one of which is collapsible or slidable within the other so that they may be adjusted to increase the length or height of the stand and to further provide said stand with a screw or threaded member for further increasing the length of the stand, said parts being so arranged relative to each other that the stand may first be adjusted to the approximate height desired and afterward adjusted the balance of the distance to the very small fraction of an inch.

With these ends in view, this invention consists in the details of construction and combination of elements hereinafter set forth and then specifically designated by the claims.

In order that those skilled in the art to which this invention appertains may understand how to make and use the same, I will describe its construction in detail referring by numerals to the accompanying drawings forming a part of this application, in which:—

Figure 1, is a side elevation of a vise stand embodying my invention.

Fig. 2, is a longitudinal or vertical sectional view thereof.

Fig. 3, is an enlarged lower end view of the lower tube or pipe.

Fig. 4, is an enlarged section at the line 4—4 of Fig. 2.

Fig. 5, is a side elevation of the feed nut or jack screw head, and

Fig. 6, is an inner end view thereof.

In carrying out my invention as here embodied 2 represents a metal tube or pipe of any desirable length and diameter having one or its lower end shaped to provide a multi-sided opening such as an octagon or hexagon into which is fitted the similarly sided lug or projection 3 of the feed nut or jack screw head 4, said feed nut also including a flange 5 adapted to engage the end of the tube or pipe 2 when the lug or projection 3 is inserted in said pipe or tube. The feed nut has a central threaded bore 6 which registers with the screw or threaded member 7 provided with a suitable enlargement 8 in which is formed a hole 9 for the reception of a tool iron bar or piece of pipe, said screw or threaded member being swiveled in a suitable stand or base member 10.

Adjacent the opposite end of the pipe or tube 2 are formed a pair of oppositely disposed or alined openings or holes 11 through which may pass a suitable holding member 12 such as a bolt, said holding member adapted to pass through any pair of the oppositely disposed or alined holes 13 formed in the other tube or pipe 14 which coöperates with the first named tube or pipe 2.

One of these pipes or tubes is collapsible within the other or slidably mounted therein and although not essential, I prefer to make the upper pipe the smaller one so that it is slidably mounted or collapsible within the lower pipe 2 and the different pairs of alined openings 13 are formed in this upper or smaller pipe and spaced apart any desirable distance so that the two pipes may be adjusted relative to each other so that when adjusted the stand will be of a height approximately the distance between the floor on which the base member 10 rests and the ceiling which is engaged by the upper end of the pipe 14 as plainly shown in Fig. 1 and when the desired adjustment is obtained, if the holding member 12 is in the form of a bolt, a nut 15 may be threaded thereon to prevent its accidental displacement.

The upper end of the tube or pipe 14 preferably has formed therewith a number of projections or prongs 16 extending from the upper edge or end of the tube so as to project into the ceiling or beam against which the upper end of the stand rests to prevent any likelihood of the upper end of the stand slipping from its position, but if the stand is to be used in a room where the ceiling must not be marred, a cap of wood or a soft pad such as felt may be placed over the prongs to prevent their direct contact with the ceiling.

On the tube or pipe 2 is mounted a bracket or table 17 of any desirable construction, the same being detachable and adjustable and although I do not wish to be limited to any precise form of bracket, I have shown one having a split collar adapted to surround the lower pipe of the stand and be held in place by suitable bolts which will draw the parts of the collar snugly and securely about the pipe 2 to prevent its accidental displacement and on this bracket or table 17 may be mounted any object such as a vise of any well known and approved construction, such a vise being shown by dotted lines in Fig. 1, but it is to be understood that this stand may be used for supporting any object to which it may be adapted and the bracket 17 may be used as a table without having an object secured thereto.

In practice, the parts of the stand may be dismantled and readily transported from place to place and after reaching the location desired, the mechanic or person desiring to use the stand may readily assemble the same with the screw or threaded member 7 threaded well into its head so that the inner end projects some distance into the pipe 2; the other pipe or tube 14 may be moved in or out as the case may be until the distance between the bottom of the base member 10 and the outer or upper end of the pipe or tube 14 is approximately the distance between the floor and ceiling of the room or building in which the vise stand is to be used and after being so adjusted, the holding member 12 may be placed through the registering holes for securing the two pipes in their relative positions. The vise stand may then be set up in an upright or vertical position and the threaded member or screw 7 revolved in the proper direction to raise the tube or pipe 2 which carries the other pipe or tube 14 therewith, thus moving it toward the ceiling until its upper end is brought into firm engagement with the ceiling or the prongs 16 forced into said ceiling after which the vise stand is ready for use and cannot be forced out of its position or removed until the jack screw is actuated in the opposite direction to release the pressure of the stand upon the floor and ceiling.

Of course I do not wish to be limited to the exact details of construction as herein shown as these may be varied within the limits of the appended claims without departing from the spirit of my invention.

Having thus fully described my invention what I claim as new and patentable is:—

1. In a vise stand the combination with two pipes, adjustable relative to each other, one of said pipes having a polygonal opening at one end, of a feed nut having a polygonal portion for registration with said opening whereby said feed nut may be detachably mounted in the end of the pipe and a screw having threaded engagement with the feed nut as shown and described.

2. A vise stand consisting of a pipe having one end so formed as to produce the polygonal opening and provided adjacent its opposite end with a single pair of alined openings, another pipe insertible within the first named pipe at the end opposite the polygonal opening and having a plurality of pairs of alined openings spaced apart throughout the length of said pipe any pair of which are adapted to register with the openings in the first mentioned pipe, holding means for insertion in the registered openings, prongs produced from the outer end of the last named pipe, a feed nut having a polygonal portion for insertion in the polygonal opening of the first mentioned pipe whereby said feed nut is detachably connected with said pipe, and a screw operatively engaging said feed nut.

In testimony whereof, I have hereunto affixed my signature.

LAWRENCE F. ROEDER.